(12) United States Patent
Hitchens (10) Patent No.: US 6,193,867 B1
(45) Date of Patent: Feb. 27, 2001

(54) MANAGEMENT OF SOIL CONDITIONS AND ELECTROOSMOTIC FLOW IN ELECTROKINETIC REMEDIATION

(75) Inventor: G. Duncan Hitchens, Bryan, TX (US)

(73) Assignee: Lynntech, Inc., College Station, TX (US)

( * ) Notice: Subject to any disclaimer, the term of this patent is extended or adjusted under 35 U.S.C. 154(b) by 0 days.

(21) Appl. No.: 09/139,790

(22) Filed: Aug. 25, 1998

Related U.S. Application Data (60) Provisional application No. 60/057,207, filed on Aug. 26, 1997.

(51) Int. Cl.[7] .................................................. C25C 1/22
(52) U.S. Cl. ........................ 204/515; 204/516; 204/517; 588/204
(58) Field of Search .................................. 205/687, 688; 204/515, 516, 517; 588/204

(56) References Cited

U.S. PATENT DOCUMENTS

| | | | |
|---|---|---|---|
| 2,831,804 | * | 4/1958 | Collopy . |
| 3,782,465 | * | 1/1974 | Bell . |
| 4,367,132 | * | 1/1983 | Bell . |
| 4,382,341 | * | 5/1983 | Bell . |
| 4,453,594 | * | 6/1984 | Patten . |
| 4,479,857 | * | 10/1984 | Barton . |
| 4,495,990 | * | 1/1985 | Titus . |
| 5,074,986 | * | 12/1991 | Probstein . |
| 5,137,608 | * | 8/1992 | Acar . |
| 5,398,756 | * | 3/1995 | Brodsky . |
| 5,405,509 | * | 4/1995 | Lomasney . |
| 5,416,257 | * | 5/1995 | Peters . |
| 5,435,895 | * | 7/1995 | Lindgren . |
| 5,458,747 | * | 10/1995 | Marks . |
| 5,476,992 | * | 12/1995 | Ho et al. ................................ 204/515 |
| 5,489,370 | * | 2/1996 | Lomasney . |
| 5,584,980 | * | 12/1996 | Griffith . |
| 5,616,235 | * | 4/1997 | Acar . |
| 5,725,752 | * | 3/1998 | Sunderland et al. .................. 204/515 |

FOREIGN PATENT DOCUMENTS

| 88202274 | * | 10/1988 | (EP) . |
|---|---|---|---|
| 88202274 | * | 1/1991 | (NL) . |

* cited by examiner

Primary Examiner—Arun S. Phasge
(74) Attorney, Agent, or Firm—Streets & Steele; Jeffrey L. Streets (57) ABSTRACT

Methods for controlling electroosmotic flow through a porous medium by applying an electric field between a plurality of electrodes positioned in a porous medium, supplying an acid solution to at least one of the electrodes and/or the soil, and supplying a zeta potential modifying compound to at least one of the electrodes is disclosed. The methods can be used to separate organic as well as inorganic contaminants from porous mediums.

36 Claims, 4 Drawing Sheets

MANAGEMENT OF SOIL CONDITIONS AND ELECTROOSMOTIC FLOW IN ELECTROKINETIC REMEDIATION

This application claims the benefit of U.S. Provisional Application No. 60/057,207 filed Aug. 26, 1997.

FIELD OF THE INVENTION

The present invention relates to electroremediation of porous mediums. Particularly, the present invention relates to a method for controlling electroosmotic flow of fluids and contaminants through a porous medium, such as soil.

BACKGROUND OF THE INVENTION

Electrokinetic phenomena include electromigration, electroosmosis, and electrophoresis. Electroosmosis is defined as the mass flux of a fluid containing ions through a stationary porous medium caused by the application of an electrical potential. The fluid moves through the voids in the porous medium (e.g. soil), called pores, where the pore walls have at least a slight electrical charge, either positive or negative. Each pore has a thin layer of charged fluid next to the pore wall having a typical thickness of between about 1 and about 10 nanometers. The thin layer of charged fluid next to the pore wall is present to neutralize the charge on the surface of the soil particle that forms the pore wall. Fluid movement occurs in soil pores because of the charge interaction between the bulk of the liquid in the pore and the thin layer of charged fluid next to the pore wall. Under the influence of a DC electric field, the thin layer of charged fluid moves in a direction parallel to the electric field. Large amounts of the bulk liquid may be transported along with the thin layer of charged fluid as well as contaminants or other species contained within the liquid.

Electromigration is defined as the mass flux of a charged ionic or polar species within a liquid or solution from one electrode to another electrode. Electromigration and electroosmosis may occur simultaneously or independently and are the dominant mechanisms through which conventional electrokinetic transport processes occur.

Electroosmosis has been used as a method for dewatering soils and sludges. Furthermore, electrokinetic metal recovery has been used as a method for mining metals, such as copper. These processes involved inserting electrodes enclosed within porous enclosures or wells into the ground. These enclosures are filled with an electrolyte solution, typically an acid solution.

Recently electrokinetic transport of materials has been applied to the electrokinetic remediation of contaminants in soil. Electrokinetic remediation, frequently referred to as either electrokinetic soil processing, electrochemical decontamination or electroreclamation, uses electrical currents applied across at least a pair of electrodes placed in the ground to extract radionuclides, heavy metals, certain organic compounds, or mixed inorganic species and organic wastes from soils and slurries and the like. The contaminants in the soil are moved under the action of the electrical field to wells where they are then pumped out.

During electrokinetic processing, water in the immediate vicinity of the electrodes is electrolyzed to produce H+ ions at the anode and OH— ions at the cathode, causing the pH of the soil to change, according to the following equations.

Anode Reaction

Equation (1)

Cathode Reaction

Equation (2)

If the ions produced are not removed or neutralized, these reactions lower the pH at the anode and raise the pH at the cathode. Protons formed at the anode migrate towards the cathode and can aid contaminant removal by increasing metal extraction. In contrast, the hydroxyl ions formed at the cathode do not migrate through soil pores as efficiently as protons and can increase the soil pH in the cathode region, as high as a pH of 12, and cause deposition of insoluble species, thereby forming regions of high electrical resistivity. These pH changes can have a significant effect on the soil zeta potential as well as solubility, ionic state and charge, and the level or adsorption of the contaminants. It is, therefore, desirable to control the pH of the fluids in the vicinity of the electrodes, as well as the pH of the fluid transported between the electrodes.

The electrical charge on a soil particle is important in the transport of pore liquid by electroosmosis. Soil particles typically have an overall negative charge. The origin of the charge on the soil when in contact with an aqueous solution results from a number of effects, including chemical and physical adsorption and lattice imperfections. The saturating liquid composition and its pH are critical to the soil surface charge. Several reports have shown that an acid front moving through the soil in the direction of anode to cathode may reduce the electroosmotic flow and eventually stop the process. The electroosmotic flow slows down because the excess H+ ions neutralize the charge on the soil particles, thus decreasing ionically driven fluid flow.

It would be beneficial to have a process capable of monitoring rates of electroosmotic flow and adjusting the charge on the soil to enhance electroosmotic flow, either on a continuous or semi-continuous basis or when the charge on the soil causes the electroosmotic flow to slow down or stop. In areas with highly porous mediums, such as sand, it would be desirable to effectively control the flow of fluids there through and overcome the gravity-induced downward drainage of the fluids. Because, the voltage drop across the well wall and the soil effects the rate of electroosmotic flow, depending on the type of soil being remediated, it would be useful if the voltage drop could be adjusted to control or improve electroosmotic flow through a porous medium.

SUMMARY OF THE INVENTION

The present invention relates to methods for modifying the zeta potential of particles in a porous medium in order to control the electroosmotic flow through the porous medium. Several compounds called "zeta potential modifying compounds" (ZPMCs) may be added to the porous medium to modify the zeta potential.

One embodiment of the present invention provides a method for controlling electroosmotic flow through a porous medium. The method includes: applying an electric field between a plurality of electrodes positioned in a porous medium; supplying an acid solution to at least one of the electrodes; and supplying a zeta potential modifying compound to at least one of the electrodes. Organic or metallic contaminants may be driven through the porous medium by electroosmosis. The ZPMC preferably changes the charge on a plurality of particles in the porous medium. The electroosmotic flow rate through the soil is monitored throughout the process, and the acid solution additions and ZPMC additions are repeated over time.

Preferably, contaminants present in the porous medium are driven through the porous medium by electromigration (anionic) and electroosmosis (organic and positively charged species). The rate of contaminant removal from the soil can be monitored. Preferably, the zeta potential modifying compound is distributed through the porous medium by electroosmosis and the concentration of the zeta potential modifying compound throughout the soil is monitored. Alternatively, the zeta potential modifying compound can be added to or near the anode well and be distributed through the porous medium by electromigration.

Suitable acid solutions include citric acid, acetic acid, oxalic acid, salicylic acid or mixtures thereof. Suitable zeta potential modifying compound solution include a negatively charged compound selected from EDTA, DTPA, NTA, or mixtures thereof.

Another method for controlling electroosmotic flow through a porous medium includes applying an electric field between a plurality of electrodes positioned in a porous medium having high hydraulic permeability, supplying a first fluid to the porous medium, distributing the fluid through the porous medium via electroosmosis, and maintaining a sufficient electric field between the electrode so that the first fluid is transported by electroosmosis between the electrodes.

In another embodiment, a method for controlling electroosmotic flow through a porous medium is provided, including, applying an electric field between a plurality of electrodes located in electrode wells positioned in a porous medium, supplying a first fluid to the porous medium, distributing the fluid through the porous medium via electroosmosis, monitoring the voltage drop across the well walls, and supplying a second fluid to an area around at least one electrode well for the purpose of decreasing the voltage drop across the well wall. Preferably, the second fluid contains a strong electrolyte selected from citric acid, oxalic acid, acetic acid, sulfuric acid, hydrochloric acid, nitric acid, basic solutions, or mixtures thereof. Preferably, the at least one electrode well is a cathode and the second fluid is supplied to the cathode well. The second solution can be supplied to the electrode well or directly to the porous medium.

Another method of the present invention includes, applying an electric field between a plurality of electrodes located in electrode wells positioned in a porous medium; supplying a first fluid to the porous medium; distributing the fluid through the porous medium by electroosmosis; and supplying a zeta potential modifying compound to an area around at least one electrode well for the purpose of decreasing the electroosmotic flow across the well wall. Preferably, the zeta potential modifying compound is selected from polyvinyl alcohol, cationic surfactants, polymers, hydrophilic linear polymers derived from cellulose, anionic surfactants, non-ionic surfactants, or mixtures thereof.

An additional method of the present invention includes, applying an electric field between a plurality of electrodes located in electrode wells positioned in a porous medium; supplying a first fluid to the porous medium; distributing the fluid through the porous medium by electroosmosis; and increasing the zeta potential of the porous medium. Preferably, the first fluid comprises low ion concentration water, such as deionized water. Preferably, the first fluid is supplied to the electrode wells.

Another method of the present invention includes applying an electric field between a plurality of electrodes located in electrode wells positioned in a porous medium; supplying a first fluid to the porous medium; distributing the fluid through the porous medium by electroosmosis; and supplying a zeta potential modifying compound to an area around at least one electrode well for the purpose of decreasing the zeta potential throughout the porous medium. Preferably, the zeta potential modifying compound is selected from polyvinyl alcohol, cationic surfactants, polymers, hydrophilic linear polymers derived from cellulose, anionic surfactants, non-ionic surfactants, or mixtures thereof.

BRIEF DESCRIPTION OF THE DRAWINGS

So that the above recited features, advantages and objects of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention provides a method for effecting electroosmotic flow in porous mediums by changing the charge on the porous medium. Porous media as referred to therein includes but is not limited to: sediment, sand, clay, agglomerates, gels, soil and concrete. The method includes inserting electrodes located in a porous wall structure into a porous matrix, such as soil. A current is applied between the electrodes and the fluid level changes in the wells surrounding the electrodes are recorded as a function of time to determine electroosmotic flow rate between the electrodes. Chemicals are introduced into the electrode wells or directly into the soil typically when the rate of electroosmotic flow is low or decreasing. These chemical additions modify the electrokinetic properties of the soil (ie. the charge on the soil) in the region between and around the electrodes. By modifying the charge on the soil, the rate of electroosmotic flow can be controlled to benefit the electroremediation process.

One aspect of the invention enhances electroosmosis by introducing negatively charged species into the soil pore fluid through electroosmosis and/or electromigration. The negatively charged species binds to the soil particles that do not have a negative charge.

In another aspect of the invention, chemicals are added to the electrode wells to stop electroosmotic flow. Charged contaminants are then driven through the soil via electromigration.

Another aspect of the invention relates to a method for establishing a threshold voltage in a region of soil such that any downward drainage of fluid through the soil is overcome and electroosmosis is the dominant fluid transport process.

In another aspect of the invention, the voltage across a region of soil is manipulated to provide the most efficient conditions for electroosmosis to occur. Chemicals are added to the soil (electrode wells) that increase the voltage distribution through the soil thus, increasing the electroosmotic flow.

In the following experiments, the soil's charge is monitored during electroremediation. This is accomplished by sampling the soil. The point from which the sample is taken is important. It must be taken between the electrodes but from an area outlying the electrodes and their porous surrounds. However, numerous measurements are made at different locations and soil depths. This zeta potential measurement indicates the degree to which the soil between the electrodes or treatment zone is suitable for sustaining electroosmotic flow.

Zeta potential can be determined from data obtained in observing soil particle motion under a microscope. Commercial instruments are available for this purpose, these include "Zeta Reader" (Komline-Sanderson Engineering Corporation); the "Mobility Meter"; Malvern's "Zetasizers" and Zetameters's "Zeta Meter". Also the zeta potential for a soil sample can be assessed by streaming current measurements, an electric current that is produced when soil or other colloidal particles are trapped in a capillary tube or in a confined space with water flowing past them at a high velocity. The flow of ions that constitutes the electric current is measurable by an instrument called a streaming current detector (SCD).

Streaming potential is generated when soil particles in liquid medium are temporarily immobilized and the bulk liquid is forced to flow past the particles. This causes a potential difference to be established before and after the soil sample which is proportional to changes in the zeta potential.

The following examples illustrate electrokinetic treatment of soil in situ. However, the treatments could be equally as effective if the soil were removed from its normal geological surroundings, transferred to a container, and then subjected to electrokinetic remediation.

EXAMPLE 1

The following example shows the combined effect of monitoring and controlling electroosmotic flow using chemical additives to enhance contaminant removal from soil. We electroremediated soil polluted by a mixture of heavy metals, lead, chromium, copper, nickel and zinc. The treatment was carried out in an apparatus consisting of a rectangular Plexiglass test bed (10.5"×5.5"×5", 4.0–5.0 kg of soil). The electrical regime was a pulsed electric field with On/Off pulse duration=10s/1s, applied for 49 days. The controlled pulse voltage amplitude was 100 V.

Electroosmotically transported water to the cathode well was monitored by measuring the change in fluid volume in the cathode well. Fluid additions were made to the cathode wells. The solutions added to the cathodes were either:

Solution 1: citric acid (2% by weight, pH=2.0); or,

Solution 2: EDTA (1% by weight)+citric acid (2% by weight, pH=3.5).

Figure 1:
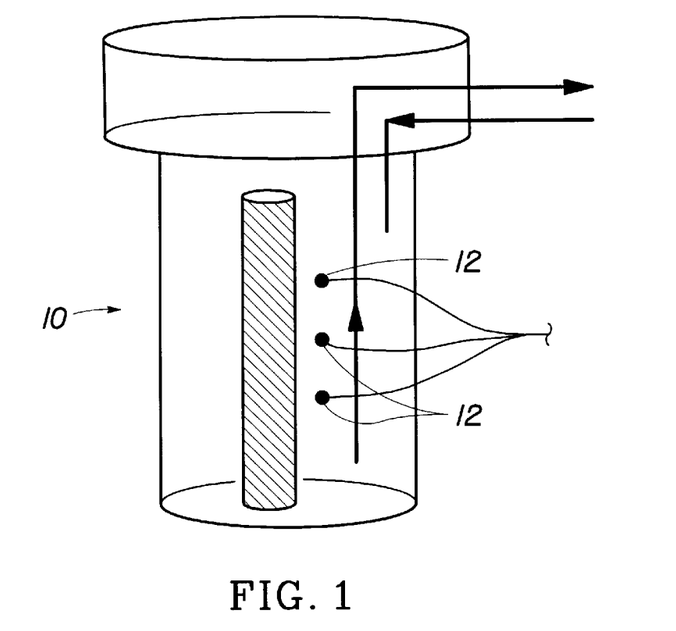
FIG. 1 is a schematic drawing of an electrode well that may be used in the present invention.

FIG. 1 is an example of an electrode well structure that can be used in the present invention. The electrode well 10 has a series of level sensors 12 that can be used to determine the rate of electroosmotic flow through the soil by monitoring the rate at which the fluid level in the well increases or decreases. There are other types of level sensors that could be used in this type of well, e.g. a continuous strip.

During the electrokinetic remediation process, automated addition of the solutions 1 and 2 kept the cathode well pH between about 5 and about 6. The soil pH was monitored was by periodic core-sampling of the soil bed between the anode and cathode wells using a core sampling device of a tubular construction. The core sampler was left in position so as not to disturb the flow paths in soil.

Figure 2:
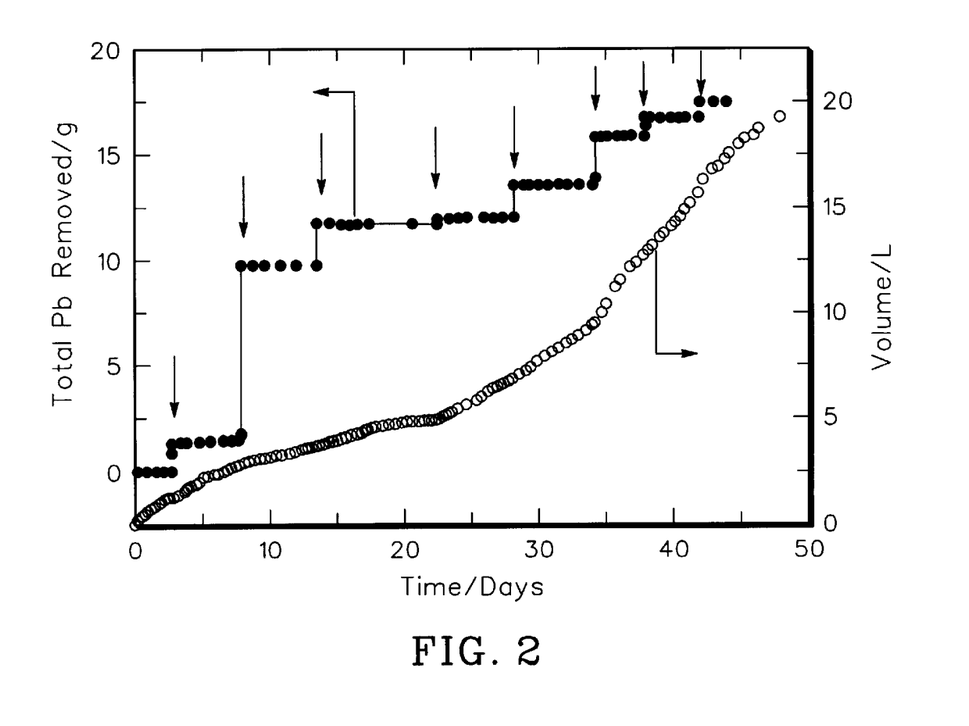
FIG. 2 is a graph showing lead removal and the electroosmotic flow through a soil bed over time.

FIG. 2 is a graph showing variations in the electroosmotic flow through the soil and the cumulative amount of lead removed from the soil, a major contaminant in the soil. During the first 22 days of treatment, the rate of electroosmotic flow through the soil decreased with time, which reduced the rate of lead removal from the soil. During this time, only solution 1 (citric acid) was added to the cathode well. Solution 1 buffered the well solution and provided soluble anions, e.g., citrates or complexing agents to the soil which act to solubilize the metals to be removed. After 22 days solution 2 (EDTA+citric acid) was fed to the cathode well. Addition of solution 2 to the cathode well significantly enhanced the electroosmotic flow through the soil and increased the volume of lead removed as well. Lead removal was determined as a sum of the lead measured in the effluent and electrode positioned at the cathode. Arrows indicate time points where the cathodes were replaced for analysis. The effect of the fluid additions on the electroosmotic flow and therefore, contaminant removal, can be immediate or more typically, the change in electroosmotic flow is over time, as the soil zeta potential modifying compounds make their way through the soil.

The electroosmotic flow through a porous medium, such as soil, is driven by a potential, called the zeta potential, established between the surface of the soil particles and the adjacent diffusion layer of pore fluid ions. The higher the zeta-potential, the higher the electrokinetic (electroosmotic) driving force. The decreased electroosmotic flow observed above occurred as a result of a decrease in the zeta-potential of the soil. Chemicals such as acids are generally used in electroremediation, and often contribute to the build-up of H+ ions in the soil. Soil particles typically have a negative charge. During electrokinetic remediation H+ ions are generated at the anode and transported through the soil in the pore fluid. The H+ ions in the pore fluid tend to reduce the negative surface charge on the soil over time, resulting in a reduction in the electroosmotic flow.

The addition of solution 2 (EDTA+citric acid solution at pH=3.5) to the cathode altered the existing charge on soil by introducing anions into the pore fluid. The negatively charged EDTA bonded to the soil particles, restoring the overall negative charge on the soil particles. Once the negative charge on the soil particles was restored, the electroosmotic flow was re-established and/or enhanced. During the electrokinetic treatment, EDTA was detected in the anode well (using UV spectroscopy), which proved that the EDTA moved through the soil via electromigration from the cathode to the anode. The EDTA was then recovered from the anode solution and recycled. FIG. 2 shows that repeated alternate additions of citric acid (pH=2.0) and EDTA+citric acid (pH=3.5) solutions to the cathode assured a constant and/or enhanced electroosmotic flow rate during the electroremediation process.

We can control the amount of zeta potential modifying compounds added to the soil by taking samples (either soil or well fluid) at various time points in the remediation process. Example 1, we could periodically sample the fluid in the anode well to establish the amount (concentration) of EDTA present. The rate of EDTA additions to the cathode wells can be adjusted based on the EDTA levels accumulating in or near the anode wells. The presence of EDTA in the anode well indicates that sufficient EDTA has been introduced into the soil. It also indicates that EDTA has been effectively distributed through the soil region between the electrodes.

Likewise, EDTA and/or other zeta potential modifying compounds may be added to the anode well (instead of the cathode wells). We can then monitor the amount of ZPMC accumulating in the cathode well or region surrounding the cathode and adjust the amount of ZPMC added to the anode well.

Another monitoring and control strategy would include taking soil samples at points of increasing distances away from the point the ZPMC is being introduced. The concentration at different points can be used to adjust the amount of ZPMC added to the wells.

It should be noted that any weak acid or other chemical that dissolves the desired contaminants in solution can be used in place of citric acid. Examples of compounds that can be added to help dissolve the metal contaminants and to control the soil pH include but are not limited to: acetic acid, oxalic acid and salicylic acid.

Mineral acids may also be included in the formulation to help dissolve and mobilize contaminants. Examples of mineral acids include: sulfuric acid, nitric acid, phosphoric acid, hydrochloric acid.

Surfactant compounds may also be included in the chemical additive solutions. Surfactants are used to help solubilize and mobilize organic compounds or contaminants that are present in the soil.

In addition, examples of complexing agents and/or zeta potential modifying compounds, ZPMCs include: citric acid, ethylene-diaminetetraacetic acid (EDTA), diethylene-triaminepentaacetic acid (DTPA), nitrilotriacetic acid (NTA).

There are several major considerations in the selection of ZPMA for soil remediation:

(i) Reagent should have a large negative charge/molecule ratio.

(ii) It is desirable that it forms stable complexes with metal contaminant over a wide pH range at a 1:1 ligand-to-metal molar ratio.

(ii) Biodegradability of the complexing agents and metal complexes should be low.

(iii) The metal complexes that are formed should be non-adsorbable on soil surfaces.

(iv) The chelating agents should have a low toxicity and low potential for environmental harm.

(v) The reagents should be cost effective.

The polydentate ligand EDTA is a preferred complexing/chelating agent because it forms exclusively 1:1 complexes of high stability with many metal ions (e.g., Zn, Cd, Cr, Pb). The tetraanion of EDTA, $(—OOCCH_2)_2NCH_2CH_2N(CH_2COO—)_2$, is an especially effective ZPMC because it provides large number of negative charges per molecule which adsorb onto the soil particles, essentially regenerating the soil surface. Also, it is a good metal complexer in that it can form five five-membered chelate rings with a single metal ion by coordination through the electron-pair donors of the four (or sometimes three) carboxylate groups and the two nitrogen atoms. EDTA is a tetraprotic acid that is usually denoted $H_4Y$. The four stepwise dissociation constants of the parent acid to yield $H_3Y^-$, $H_2Y^{2-}$, $HY^{3-}$ and $Y^{4-}$ are $1.00×10^{-2}$, $2.16×10^{-3}$, $6.92×10^{-7}$ and $5.50×10^{-11}$, respectively. The existence of these forms in soil is dependant on the soil pH. In pH ranges relevant for the electrokinetic soil remediation major metal-EDTA complexes, e.g. for divalent metals, are represented by the following equations:

pH=4–5

$$M^{2+}+H_2Y^{2-}\mathrel{<=>}MY^{2-}+2H^+ \quad (4)$$

pH=7–9

$$M^{2+}+HY^{3-}\mathrel{<=>}MY^{2-}+H^+ \quad (5)$$

In low pH solutions the metal-EDTA complex may exist also as $HMY^-$ or $H_2MY$.

Also, inorganic additives such as liming materials (CaO, $CaCO_3$, $MgCO_3$) can be added to neutralize the soil, i.e., reduce the amount of positive hydrogen ions present in the soil and increase negative charge on the soil. In highly saline and sodic soils (high pH>10), gypsum ($CaSO_4$) or diluted inorganic acid ($H_2SO_4$) can be added to change caustic alkali carbonates into sulfates. This makes the metals more mobile in sodic soil pore fluid and therefore accessible to the electrokinetic process.

The ZPMCs may be included along with other chemicals such as acids or bases used to control the pH of the anodes and cathodes, to increase the efficiency of the electroremediation process.

Figure 3:
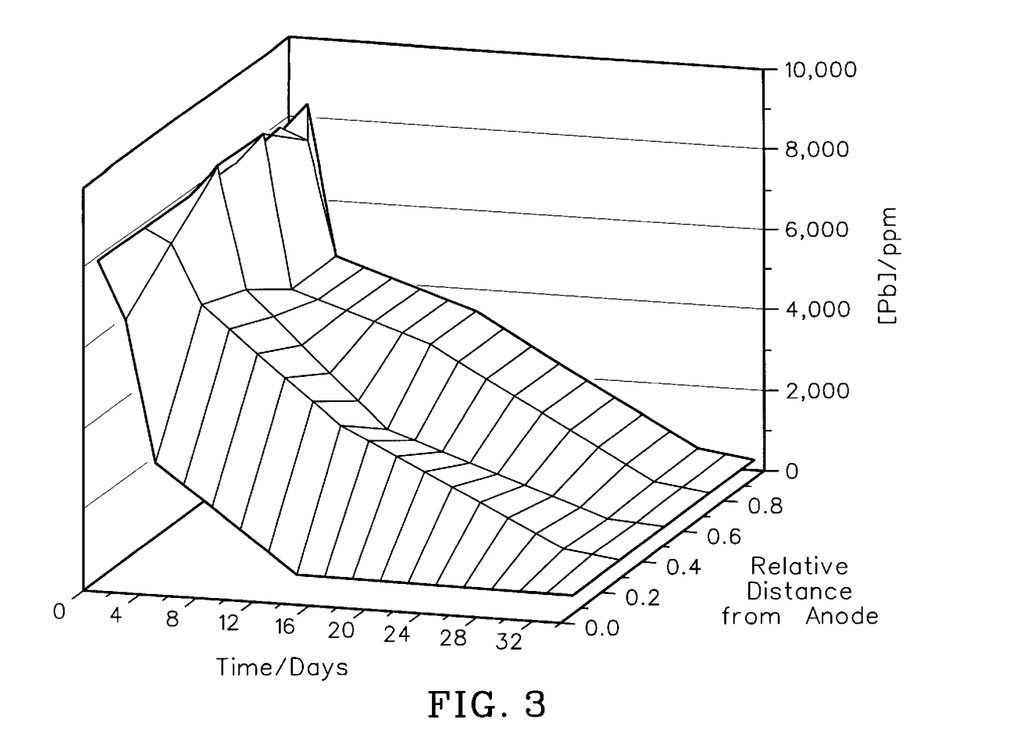
FIG. 3 is a graph showing the profile of lead concentration in the soil during electrokinetic remediation.

FIG. 3 is a graph showing profiles of lead concentration throughout the soil test bed during the experiment. The lead concentration profiles represent an average of two samples obtained from the central portion of the soil and the soil portion closer to the cell wall. After 49 days of the electrokinetic treatment, 93% of lead contamination was removed from the soil. Approximately 76% of total lead removed was electrodeposited on the cathode. The cathode was exchanged when lead electrodeposit became too voluminous. Table 1 summarizes the removal of all the heavy metal contaminants present in the soil after 49 days of treatment.

TABLE 1

Contaminant concentration in soil before and after electrokinetic remediation.

| Metal | Concentration before treatment (ppm) | Concentration after 49 days of treatment (ppm) | % removed after 49 days |
|---|---|---|---|
| Lead | 7,863 | 534 | 93 |
| Copper | 208 | 42 | 80 |
| Chromium | 98 | 64 | 35 |
| Zinc | 92 | 41 | 45 |

Example 1 demonstrates that a continuous electroosmotic flow can be established through the soil during the electrokinetic process by alternate addition of a citric acid solution and an EDTA+citric acid solution having a different pH than the citric acid alone. Thus, highly efficient removal of heavy metals from soil can be achieved by both electromigration and electroosmosis. A pulsed electric field, on time 5 s, off time 20 s, between 10 and 300 V per cm, was applied to further enhance the desorption of the heavy metals from the soil because of the frequent formation and changes of the electrochemical double layer structure and in zeta-potential of soil particles during pulsing. Alternatively, a conventional DC field may be used.

Electrokinetic remediation is typically used to separate metals from soil or other porous mediums. However, electroremediation can be used to separate organic pollutants such as non aqueous phase liquids and hydrocarbons from porous mediums such as soil. Electroosmosis is the primary process used to separate organic contaminants from porous mediums, because the organic molecules are not charged. ZPMCs therefore are ideal for removing organics from soil and other porous mediums, because the ZPMC adsorb to and maintain a negative charge on the soil particles which in turn promotes electroosmosis.

There are rare circumstances where the soil particles carry at net positive charge. In this situation, the zeta potential required for the soil to support electroosmotic flow, will be diminished by the accumulation of anionic species (negatively charged compounds) at the surface of the soil particles. This accumulation may occur during the normal execution of an electroremediation process. To restore electroosmotic flow, it may be beneficial to introduce into the soil chemical species that carry a net negative charge in order to reverse the charge on the soil particles. In this example, appropriate zeta potential modifying compounds that could be added to the soil include but are not limited to: large organic multi-charged ions. Examples of ZPMC additives which can be used on positively charged soil, to change the soil charge from positive to negative are similar to those mentioned above. These include: (i) a base or hydroxyl anions, (ii) anions of carboxylic and aminocarboxylic acids such as EDTA, DTPA, NTA, and (iii) liming materials. Characteristics of the additive molecules preferably include: (i) large negative charge/molecule ratio; (ii) the chemical nature of the organic ligands (functional groups) should promote the adsorption on the soil and/or organic matter.

The compounds could be added to the soil in the same manner as described in the example above. The addition of these compounds may be tracked and their distribution and concentration in the soil monitored as described above. The amount of ZMPC added per unit time may be adjusted according to these measurements.

In addition, it is possible to effect electroosmotic flow through a porous medium by introducing water into the medium. However, the water must be of a low ionic content (essentially deionized). Adding water will remove charged species from around the soil particles. This will have the effect of increasing the zeta potential, thereby stimulating electroosmotic flow. The water can remove naturally occurring ions from around the soil particles. Water can also remove excess charged additives chelating agents complexing agents etc, that have been introduced during previous stages of electroremediation. The water can be added to the electrode wells or directly into the soil. Typically, if electroosmotic flow is from anode to cathode, the deionized water would be introduced into the anode well. The amount of water distributed through the soil can be determined by measuring the fluid levels in the electrode wells. For example, if water is being added to the anode wells, we can monitor the dissolved ion content in the cathode wells with a conductivity meter.

Alternatively, techniques such as ion chromatography and gas chromatography can be used to detect the presence of specific ions in the well fluid or in the soil. We would expect the ionic concentration in the cathode well to decrease slowly over time if the water treatment is effective. We would also expect specific ion concentrations to decrease. The water can be added in conjunction with measurements of electroosmotic flow.

Figure 4:
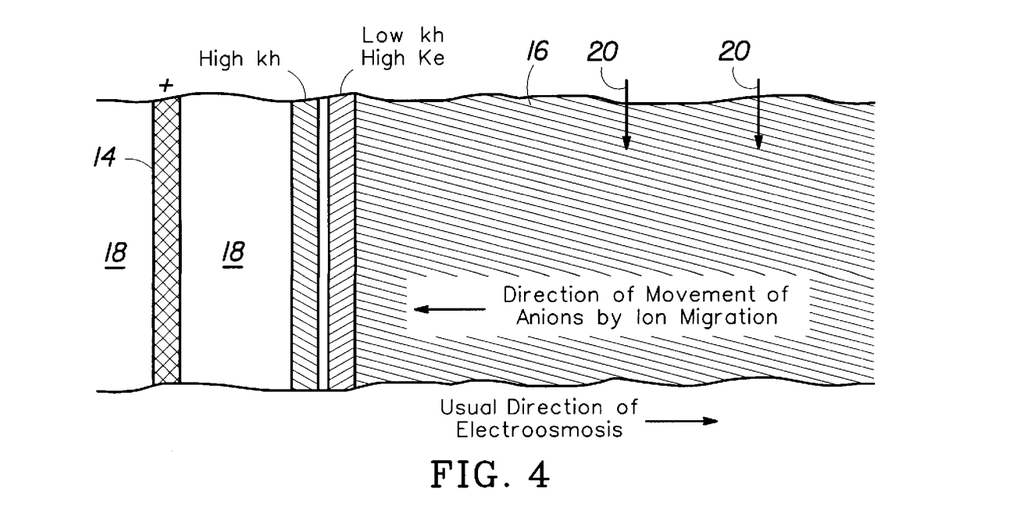
FIG. 4 is a schematic drawing of an electrode well and a soil region.

At times during electroremediation, contaminant migration (brought about by electroosmosis) and contaminant migration (brought about by electromigration) cause species to move in opposite directions. FIG. 4 shows electroremediation at an anode 14. The soil region 16 supports electroosmotic flow. The contaminant of interest is an anion, such as a chromate, arsenate, or uranate. The use of electromigration to bring the anion into the well 18 is inhibited or slowed down because electroosmosis is typically in the direction of the cathode (not shown). In this instance it would be beneficial to inhibit electroosmotic flow in all or part of the soil.

In conjunction with an electroosmotic flow measurement, a chemical formulation may be added to the electroremediation system to reduce electroosmotic flow by diminishing the charge on the soil. Certain ZPMAs have the ability to form a permanently adsorbed layer which effectively eliminates electroosmotic flow. Examples of these chemicals can be found in capillary electrophoresis literature, and include polyvinyl alcohol, cationic surfactants (e.g., cetyltrimethylammonium bromide, CTAB, trimethylammonium bromide, TTAB), polymers (e.g., polyacrylamide) or hydrophilic linear polymers derived from cellulose (e.g., methyl cellulose). However, cheaper surfactants and those easier applied to soil applications can include anionic surfactants such as, sodium dodecyl sulfate (SDS), Dioctyl sulfonate, Aerosol OT and diphenyl oxide disulfonate (DOWFAX 3B2), and non-ionic surfactants, such as, polyoxyalkylated fatty acid ester (ADSEE 799).

The chemical formulation can be introduced into the anode well 18 or directly injected into the soil region 16, preferably, at fluid introduction sites 20. The chemical formulation can be distributed through the soil by electroosmotic flow until the electroosmotic flow has been diminished.

Chemical formulations may also be used to effect the electroosmotic flow through the well wall. In some situations it is desirable to achieve high levels of ion uptake by electromigration without losing the contaminants due to fluid movement out of the well. The well used in this instance is porous and can be composed of a clay like material or a porous ceramic. If the well wall consists of one or more different layers, then at least one of these layers would preferably consist of a porous clay layer or a porous ceramic. The porous nature of clays and certain ceramics imparts a high electroosmotic permeability and low hydraulic permeability to the well wall. A well wall surrounding the electrode having a high electroosmotic potential (ke) and a low hydraulic permeability potential (kh) such as clay, is advantageous and is typically preferred for electromigration. The high ke and low kh enables contaminants to be carried through the well wall by ion migration and ultimately retained within the well with little chance of downward drainage. During a typical electroremediation process, acidification at one of the electrode wells and subsequent migration of acid species will effect the zeta potential of the porous materials forming the well walls i.e., the zeta potential will be diminished at the well wall causing a decrease in electroosmotic flow. However, it should be noted that if the chemical formulation has been effective in reducing the charge on the pores through the well wall, the high ke low kh well wall will be converted to a low ke low kh well wall.

It would be beneficial when the electroosmosis is diminished to add to the well wall to enhance electroosmotic flow. The formulations can contain ZPMCs such as EDTA, DTPA, NTA, CaO, $CaCO_3$, $MgCO_3$. These can be added to the fluid that is contained in the well and/or directly into the wall of the well through flow channels. The ZPMC fluids can also be added to the soil immediately adjacent to the outside surface of the wells. Electroosmotic flow, ion migration or a combination of both can cause the ZPMCs to be moved into the porous layers of the well wall. The ZPMCs act to increase the zeta potential of the materials that form the porous layers of the well walls, thereby stimulating the electroosmotic permeability of the material (ke).

In some circumstances, where ion migration is the desired method for moving a charged species through the well wall, it is desirable to inhibit electroosmotic flow through the well wall. This can be accomplished using compounds such as polyvinyl alcohol, cationic surfactants (e.g., cetyltrimethylammonium bromide, CTAB, trimethylammonium bromide, TTAB), polymers (e.g., polyacrylamide) or hydrophilic linear polymers derived from cellulose (e.g., methyl cellulose) sodium dodecyl sulfate—SDS, Dioctyl sulfonate—Aerosol OT and diphenyl oxide disulfonate—Dowfax 3B2, and non-ionic surfactants—polyoxyalkylated fatty acid ester—Adsee 799. These can be introduced into the well wall using the methods mentioned above.

It should be noted that these compounds can be added as part of a cocktail of chemicals that contain, in addition to ZPMCs, also contain acids and bases for controlling the pH in the electrode wells and in the regions surrounding the electrode wells. The cocktail can also contain specific agents added to assist in solubilizing or chelating the metal contaminants.

It is possible that in some cases the direction of electroosmotic flow is not from anode to cathode, as shown in FIG. 4, but from cathode to anode. This could occur for example if the soil particles, in their natural state are positively charged rather than being negatively charged. This unusual situation could be caused by the build up of positive charges on the soil particles during the remediation process. Under these circumstances, if the goal is to remediate at positively charged contaminant, electromigration would cause the contaminant to move in the direction of the cathode while at the same time electroosmosis is causing the contaminant to move towards the anode. This situation is undesirable. Zeta potential modifying compounds can be added to the soil or to the electrode wells to change the charge on the soil from positive to negative. The chemical formulation will be distributed through the soil until electroosmotic flow has been diminished. The type of chemicals that can be added to reduce electroosmotic flow as described in this example can include as follows (i) a base or hydroxyl anions, (ii) anions of carboxylic and aminocarboxylic acids such as EDTA, DTPA, NTA, and (iii) liming materials. Characteristics of the additive molecules should be: (i) large negative charge/molecule ratio; (ii) the chemical nature of the organic ligands (functional groups) that promote the adsorption on the soil and/or organic matter.

Electroremediation can be carried out by adding soil modifying chemicals in response to voltage measurements, or changes in voltage measurements that occur in the porous matrix or in different parts of the electroremediation set up, in order to effect electroosmotic flow. This embodiment provides a method of monitoring the appropriate voltage between specific points in the electroremediation system and establishing an appropriate voltage distribution in the soil for optimum electroosmotic flow using chemical additives.

EXAMPLE 2

Figure 7:
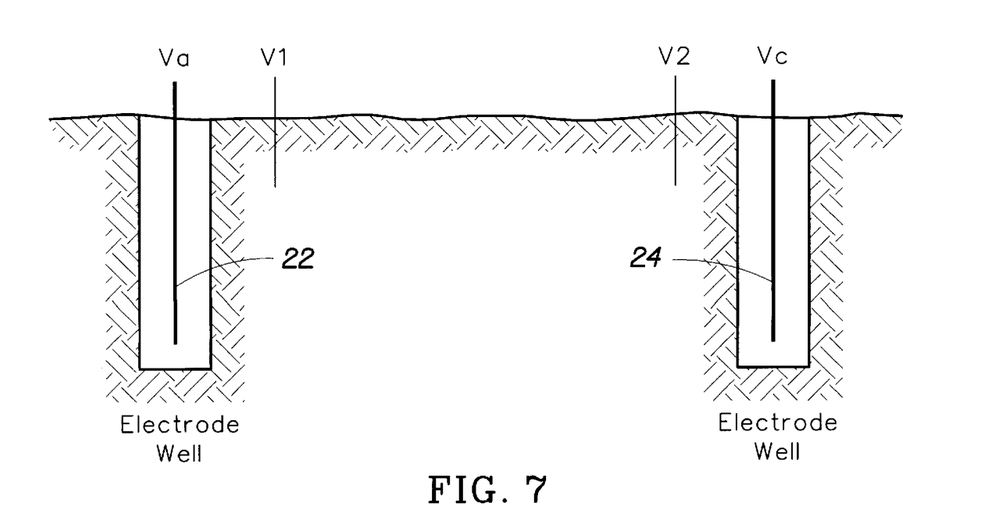
FIG. 7 is a schematic drawing of an electrode, voltage probe arrangement.

Using the electrode/voltage probe set-up illustrated in FIG. 7, an electric field is applied between the electrodes 22, 24. The voltage probes V1 and V2 indicate the resulting voltage drop in the soil. These voltage probes are positioned immediately adjacent to the exterior walls of the electrode wells. When attempting to maximize electroosmotic flow through the soil it is preferable to have the voltage drop across the soil (designated as V1—V2 or $\Delta V_{1,2}$) at the highest value possible for a given applied current.

The electrodes had porous walls and were inserted into the ground. A current was applied between the electrodes and the voltage was monitored across the system, in particular the voltage drop was monitored in the zone where electroosmosis was occurring. At least two voltage probes were inserted into the ground adjacent to the porous walls of the cathode and anode wells. It is preferred that the voltage measurements be made between two or more probes near the electrode wells because the voltage drop between V1 and V2 indicates the ability of the soil to support electroosmotic flow. We know this from the Helmholtz-Smuluchowski theory which states that electrokinetic processes are proportional to the electric field applied. Depending upon whether the measured voltage is high, low, increasing or decreasing, chemicals are added to the electrode well.

If the voltage is low, then ZPMCs are added to the region between the electrodes that will increase the zeta potential. This will be reflected an increase in $\Delta V_{1,2}$. If during the course of electroremediation, as may be expected to happen, $\Delta V_{1,2}$ is diminished with time from its initial value, then ZPMCs can be added to increase the soil voltage. Additional doses of ZPMCs can be added in this fashion as the voltage between the soil probes decreases. Examples of compounds that could be added to increase the soil voltage include but are not limited to: citric acid EDTA, DTPA, NTA, CaO, $CaCO_3$, $MgCO_3$. These can be added to the fluid that is contained in the wells and/or directly into the soil. Electroosmotic flow, ion migration or a combination of both can cause the ZPMCs to be moved through the soil region between the electrodes. These ZPMCs will stimulate the electroosmotic permeability (ke) of the porous medium between the electrodes.

It may be desirable, when using electromigration to remove anionic contaminants, to reduce or stop electroosmosis through the porous medium. This can be accomplished using compounds such as polyvinyl alcohol, cationic surfactants (e.g., cetyltrimethylammonium bromide, CTAB, trimethylammonium bromide, TTAB), polymers (e.g., polyacrylamide) or hydrophilic linear polymers derived from cellulose (e.g., methyl cellulose) sodium dodecyl sulfate—SDS, Dioctyl sulfonate—Aerosol OT and diphenyl oxide disulfonate—Dowfax 3B2, and non-ionic surfactants—polyoxyalkylated fatty acid ester—Adsee 799. These can be introduced into the electrode wells or directly into the soil using the methods mentioned above. The voltage measurement $\Delta V_{1,2}$ can be used to determine when and what concentration of ZPMCs to add. A high $\Delta V_{1,2}$ indicates a need for adding these compounds because high voltage promotes electroosmotic flow. If electroosmotic flow has ceased, but the voltage drop between the probes begins to increase, this is an indication to introduce more of the solution into the soil region between the electrodes.

It should be noted that the ZPMCs used either to stimulate or diminish the voltage drop through the soil can be added as part of a cocktail of chemicals that, in addition to ZPMCs, also contain acids and bases for controlling the pH in the electrode wells and in the regions surrounding the electrode wells. The cocktail can also contain specific agents added to assist in solubilizing or chelating the metal contaminants.

It is important to maximize the voltage drop through the region of the soil where electroosmosis is to occur while simultaneously minimizing the voltage drop in other regions. In particular for efficient electroosmosis, it would be advantageous for the voltage drop between the electrode and its surrounding solution to be low as possible, so that the voltage applied to the electrode is transferred to the soil and not spent on the well solution. It is also preferred that the voltage drop across the porous well wall be as low as possible. The well wall preferably has a porous layer such as PVC with large holes extending therethrough, that has a high "throwing power" (i.e., it supports high levels of electrolyte and current flow).

The purpose here is to use the strategically placed voltage probes as shown in FIG. 7. The voltage probes provide the voltage drop across the soil ($V_1$–$V_2$ or $\Delta V_{1,2}$). The voltage drop between the anode and the soil ($V_a$–$V_1$); and the voltage drop between the cathode and the soil ($V_c$–$V_2$). While it is desirable usually to have the voltage drop in the soil zone (i.e., $\Delta V_{1,2}$) as high as possible, it is almost always desirable to have the voltage drop between the electrodes and the soil as low as possible (i.e, Va–$V_1$ and Vc–$V_2$ should be minimized).

Chemical additions may be made to minimize the voltage drop across the well walls. If the voltage between the cathode and the voltage probe immediately adjacent to the outside wall of the cathode well (Vc–$V_2$) begins to increase from its initial value during electroremediation (i.e, when a current is applied), a conductive solution (a strong electrolyte) is added. Typically this solution will contain an acid and would be added to the solution in the cathode well or be introduced into the soil region immediately surrounding the cathode well. The acid could be an organic acid, such as citric acid, acetic acid or oxalic acid. Otherwise, a mineral acid such as sulfuric acid, hydrochloric acid or nitric acid could be used. The solution added here is preferably an acid but in some instances a salt solution or a base solution could be used. Similarly on the anode side, if the voltage drop across the well wall ($V_a$–$V_1$) increases from its starting value during electroremediation, a strong electrolyte solution consisting of the above mentioned acids will be added to the solution in the electrode wells or into the soil region surrounding the electrode wells. It need not necessarily be an acid. A basic solution can be used or a neutral pH solution can be used that contains a substantial amount of dissolved ions.

It is important to note that measurement of the voltage drop between the two electrodes $V_a$–$V_c$ shown in FIG. 7 does not give a measurement of the soils' ability to support electroosmotic flow. This is true because the measurement of the voltage $\Delta V_{a,c}$ includes contributions from the solution surrounding the electrodes and contributions of the well walls. It is also important to note that the voltage probes $V_1$ and $V_2$ preferably lie outside the electrode wells and are not in direct electrical contact with the anode and cathode.

The set-up shown in FIG. 7 could be modified to include additional voltage probes. In particular, voltage probes could be placed immediately adjacent to the inner surface of the electrode wells, to complement the ones close to the outer surface of the electrode wells. The voltage difference between these inner and outer probes should also serve to initiate the addition of treatment chemicals to the wells or regions surrounding the wells.

Additions made to minimize the voltage drop in the regions of the electrode wells can be carried out at the same time additions are made to modify the soils' zeta potential. Alternatively, additions to the soil and electrode wells can be made independently of each other. Chemical additions could be made automatically from a solution reservoir using a electronic feedback system connected to the voltage probes that monitor the voltage profile in selected zones or over the entire electroremediation system.

To provide high current and low voltage drop across the well solution and well wall during the electrokinetic soil processing, good contact between the soil and electrodes is needed. This is achieved by maintaining a fluid level in the wells which ensures that electrodes are constantly immersed in fluid. Thus, one factor affecting the design of the electrode well is the hydraulic permeability of the well wall. Well walls with low hydraulic permeability keep the electrode in contact with the solution and minimize the amount of liquid added to the well.

EXAMPLE 3

Water leaking out of the wells and water transported by electroosmosis between the electrode wells in the soil is affected by gravity. The following is an example of using voltage drop alone to manage electroosmotic flow in mediums such as sandy soil where fluid loss by gravitation is an issue.

Figure 5:
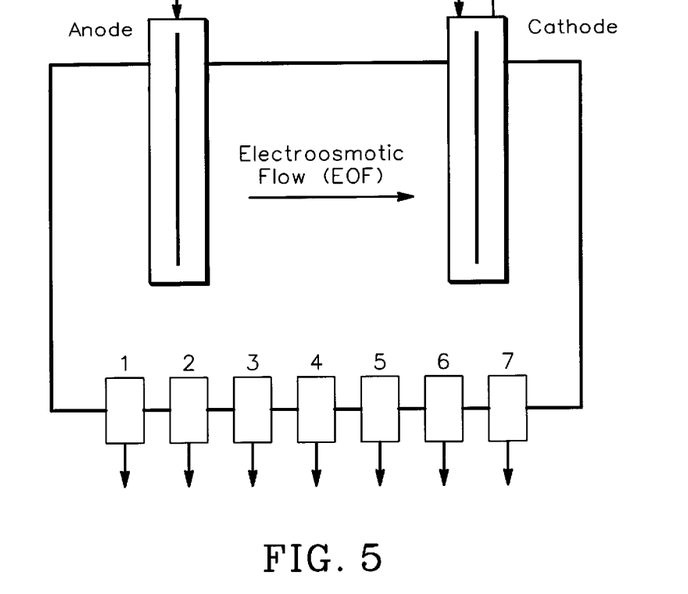
FIG. 5 is a schematic drawing of a soil bed used the present invention.

FIG. 5 shows a schematic view of a soil bed (1'3"×3.5"×10"), made of Plexiglas used to measure the horizontal electroosmotic water transport through the soil in conditions where gravitational flow was provided for at the bottom of the soil bed. Vertical, gravitational flow was made possible using seven uniformly spaced (0.5 cm dia., 2"apart) outlets drilled through the bottom of the soil bed. Below each outlet a graduated cylinder served as a water collector. Slotted PVC pipes (½" in dia., 0.014" slot width, wrapped with polyethylene filt) served as electrode wells. The electrode wells were placed in the soil down to within about 1.5" from the bottom of the soil bed. The anode well was positioned above the second outlet and the cathode well was positioned above sixth bottom outlet of the soil bed. Both wells were supplied with tap water from a constant pressure tank. Electroosmotically transported water to the cathode well was collected in a separate tank using a suction tube and a vacuum pump. DC electric fields were imposed on soil samples under the constant voltage or constant current regimes, using EMS 10 kW DC power supplies, Model 16. Pulsed DC electric fields were applied through the soil using low frequency rectified sinusoidal electric fields applied by a 10 kW Techron Power Amplifier in connection with a step-up transformer.

Figure 6:
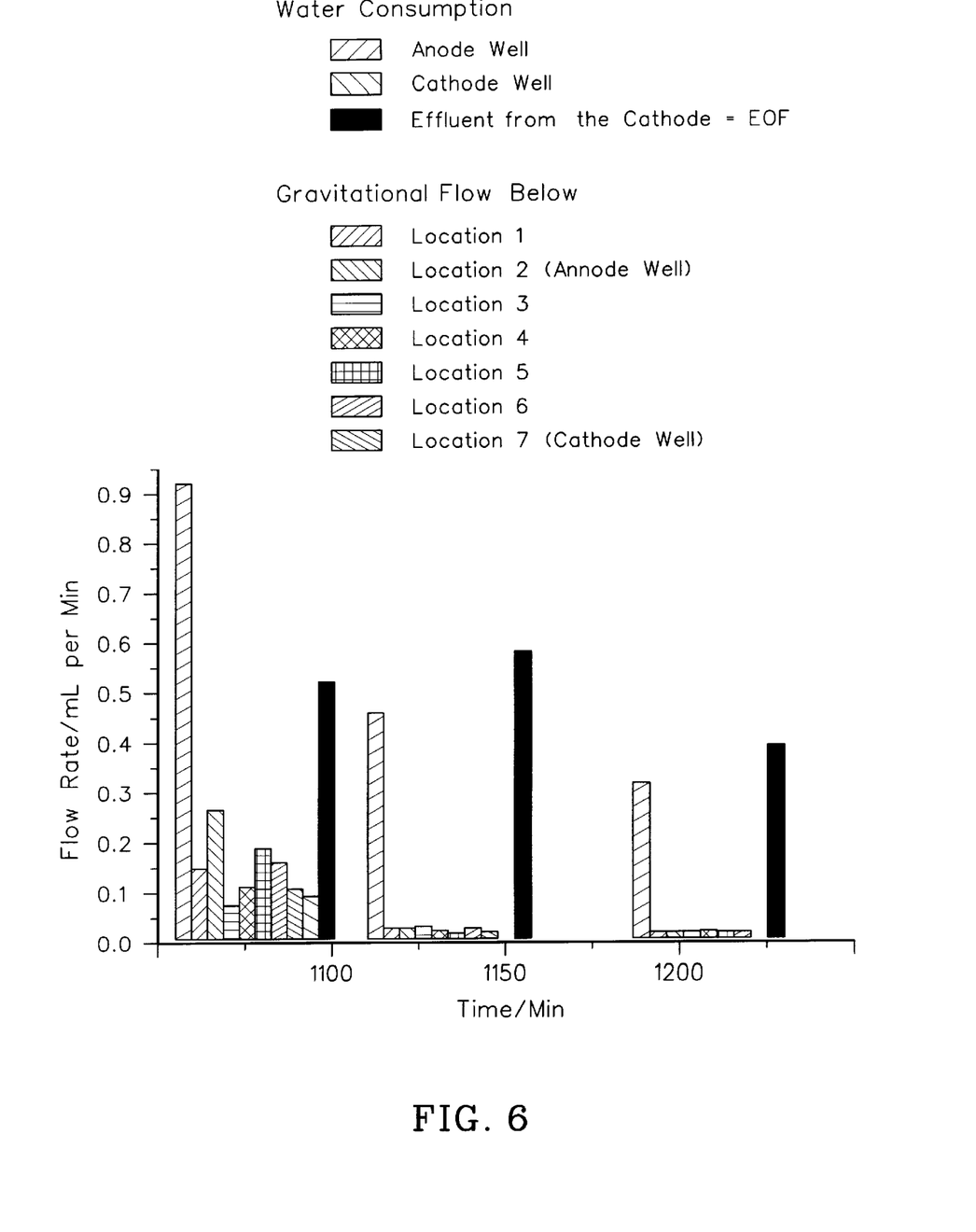
FIG. 6 is a graph of various fluid flow rates over time.

FIG. 6 is a graph showing the distribution of horizontal and vertical transport of water in the soil bed described above filled with sandy/silty soil with starting moisture content of about 10%. Water was added to the anode and cathode until the soil was moisturized and a constant (downward) flow rate was established at each outlet at the bottom of the cell. A high voltage (300 V amplitude) was then applied between the electrodes. Water continued to be lost from the anode well as a result of gravitational flow and electroosmotic transport to the cathode. Water transported toward the cathode by electroosmosis was measured as the effluent from the cathode. At the beginning of the experiment, water flow from all the outlets at the bottom of the cell, including the outlet below the anode (location 2) and the cathode well (location 6), was uniform. After establishing the electroosmotic flow through the soil, the gravitational flow measured at the bottom outlets decreased with time and eventually stopped, especially near the cathode where water was drawn into the cathode well by electroosmosis. This experiment demonstrated that it is possible to prevent the downward water movement through the soil during the electrokinetic processing by establishing a "threshold voltage" through the soil. Threshold voltage can be defined as the voltage required to maintain electroosmotic flow in a region of soil. We can determine the threshold voltage necessary to eliminate downward drainage by using a treatability study. This would require taking an intact soil sample, (with minimal disturbance to the soil structure) to a laboratory soil bed test fixture such as the one described in Example 3. Voltage probes, V1 and V2 (see FIG. 7) are positioned in the soil adjacent to the electrode well walls and voltage measurements are taken. It is important to take the voltage drop readings from the voltage probes in the soil and not the voltage drop between the electrodes. The voltage probes in the soil provide a more accurate representation of the actual voltage being applied to the soil. We can then test various voltages to establish the critical threshold voltage for maintaining the electroosmotic flow through the soil.

In order to monitor the effectiveness of the threshold voltage in the field, we can use tracer studies. Uncharged tracer molecules (e.g., tritium, radioactive carbon or phosphorous compounds, fluorescein, rhodamine, etc.) can be added to the soil zone between the electrodes. During electroremediation, the soil within the soil zone and immediately beneath the soil zone of interest can be sampled and tested for the tracer molecules. The tritium, radioactive carbon or phosphorous compounds can be detected by conventional scintillation methods and the fluorescein, rhodamine can be detected by fluorescence spectroscopy Different voltages may be applied until a critical threshold voltage is achieved such that the tracer molecules are no longer observed in the zone beneath the treatment zone.

Obviously the ZPMCs and other chemicals discussed above can be added to the soil to assist in maintaining the soil voltage in the appropriate range.

Once a threshold voltage is established, the electroosmotic flow overcomes the gravitational flow in the soil and charged contaminants are contained between the electrodes by electromigration.

The amplitude of the "threshold voltage" (both for dc and ac electric field applied) will depend on the well construction and soil characteristics. It is generally desirable to apply high voltage through the soil to achieve high electromigration and electroosmotic flow. However, the voltage applied at the electrodes should not increase the temperature of the well solutions above a predetermined level. Thus, in soils of low hydraulic permeability, e.g. $<10^{-4}$ cm/s, such as silty and clayey soils a desirable well design will provide a low voltage drop across the well wall and high voltage gradient throughout the soil. However, in soil with higher hydraulic permeability, e.g. $>10^{-4}$ cm/s, such as sandy soil, it may be desirable that the majority of the voltage drop is across the electrode well wall to achieve maximum driving force for the electrokinetic removal of contaminants.

While the foregoing is directed to the preferred embodiment of the present invention, other and further embodiments of the invention may be devised without departing from the basic scope thereof, and the scope thereof is determined by the claims which follow.

I claim:

1. A method for controlling the rate of electroosmotic flow through a porous medium comprising:
   (a) applying an electric field between a plurality of electrodes positioned in a porous medium;
   (b) monitoring the electroosmotic flow rate through the porous medium; and
   (c) supplying a zeta potential modifying compound to at least one of the electrodes to control the rate of electroosmotic flow.

2. The method of claim 1, further comprising:
   driving organic contaminants through the porous medium by electroosmosis.

3. The method of claim 1, further comprising:
   changing the charge on a plurality of particles in the porous medium.

4. The method of claim 1, further comprising the step of establishing a threshold voltage to prevent downward water movement through the soil during the electrokinetic method.

5. The method of claim 1, further comprising:
   driving contaminants through the porous medium by electromigration and electroosmosis.

6. The method of claim 1, further comprising:
   monitoring the rate of contaminant removal from the soil.

7. The method of claim 1, further comprising:
   distributing the zeta potential modifying compound through the porous medium by electroosmosis; and
   monitoring the concentration of the zeta potential modifying compound throughout the soil.

8. The method of claim 1, further comprising:
   distributing the zeta potential modifying compound through the porous medium by electromigration.

9. The method of claim 1, wherein the acid solution is selected from citric acid, acetic acid, oxalic acid, salicylic acid or mixtures thereof.

10. The method of claim 1, wherein the zeta potential modifying compound solution comprises a negatively charged compound selected from EDTA, DTPA, NTA, or mixtures thereof.

11. The method of claim 1, wherein the acid solution comprises about 2% by weight citric acid having a pH of about 2.0.

12. The method of claim 1, wherein the zeta potential modifying compound comprises about 1% by weight EDTA.

13. The method of claim 1, wherein the zeta potential modifying compound further comprises an acid solution.

14. The method of claim 1, wherein the electrodes comprise anodes and cathodes and the zeta potential modifying compound is supplied to at least one cathode or at least one anode.

15. The method of claim 1, wherein the zeta potential modifying compound changes the charge in the porous medium.

16. The method of claim 1, further comprising the step of reducing electroosmotic flow by supplying a zeta potential modifying compound that is a surfactant.

17. The method of claim 1, wherein the step of monitoring the electroosmotic flow rate comprises monitoring the rate at which the fluid level in the well increases or decreases.

18. The method of claim 1, wherein the zeta potential modifying compound is supplied to the electrode well.

19. The method of claim 1, wherein the zeta potential modifying compound is supplied to the soil between electrodes.

20. The method of claim 1, wherein the step of monitoring the electroosmotic flow rate utilizes a level sensor in a well around one of the electrodes.

21. A method for controlling electroosmotic flow through a porous medium comprising:
   applying an electric field between a plurality of electrodes positioned in a porous medium having high hydraulic permeability;
   supplying a first fluid to the porous medium;
   distributing the fluid through the porous medium via electroosmosis;
   monitoring the rate of electroosmotic flow through the porous medium; and
   maintaining a sufficient electric field between the electrodes so that the first fluid is transported by electroosmosis between the electrodes.

22. The method of claim 2, further comprising the step of establishing a threshold voltage to prevent downward water movement through the soil during the electrokinetic method.

23. A method for controlling electroosmotic flow through a porous medium comprising:
- applying an electric field between a plurality of electrodes located in electrode wells positioned in a porous medium;
- supplying a first fluid to the porous medium;
- distributing the fluid through the porous medium via electroosmosis;
- monitoring the voltage drop across the well walls; and
- supplying a second fluid to an area around at least one electrode well for the purpose of decreasing the voltage drop across the well wall.

24. The method of claim 23, wherein the second fluid contains a strong electrolyte and the at least one electrode well is a cathode.

25. The method of claim 24, wherein the strong electrolyte is selected from citric acid, oxalic acid, acetic acid, sulfuric acid, hydrochloric acid, nitric acid, basic solutions, or mixtures thereof.

26. The method of claim 23, wherein the second solution is supplied to the electrode well.

27. The method of claim 23, wherein the second solution is supplied to the porous medium adjacent to the electrode well.

28. A method for controlling electroosmotic flow through a porous medium comprising:
- applying an electric field between a plurality of electrodes located in electrode wells positioned in a porous medium;
- supplying a first fluid to the porous medium;
- distributing the fluid through the porous medium by electroosmosis;
- monitoring the rate of electroosmotic flow through the porous medium; and
- supplying a zeta potential modifying compound to an area around at least one electrode well for the purpose of decreasing the electroosmotic flow across the well wall.

29. The method of claim 28, wherein the zeta potential modifying compound is selected from polyvinyl alcohol, cationic surfactants, polymers, hydrophilic linear polymers derived from cellulose, anionic surfactants, non-ionic surfactants, or mixtures thereof.

30. A method for controlling electroosmotic flow through a porous medium comprising:
- applying an electric field between a plurality of electrodes located in electrode wells positioned in a porous medium;
- supplying a first fluid to the porous medium;
- distributing the fluid through the porous medium by electroosmosis; and
- increasing the zeta potential of the porous medium.

31. The method of claim 30, wherein the first fluid comprises low ion concentration water.

32. The method of claim 30, further comprising supplying the first fluid to the electrode wells.

33. A method for controlling electroosmotic flow through a porous medium comprising:
- applying an electric field between a plurality of electrodes located in electrode wells positioned in a porous medium;
- supplying a first fluid to the porous medium;
- distributing the fluid through the porous medium by electroosmosis;
- monitoring the rate of electroosmotic flow through the porous medium; and
- supplying a zeta potential modifying compound to an area around at least one electrode well for the purpose of decreasing the zeta potential throughout the porous medium.

34. The method of claim 33, wherein the zeta potential modifying compound is selected from polyvinyl alcohol, cationic surfactants, polymers, hydrophilic linear polymers derived from cellulose, anionic surfactants, non-ionic surfactants, or mixtures thereof.

35. A method for controlling the rate of electroosmotic flow through a porous medium comprising:
- (a) applying an electric field between a plurality of electrodes positioned in the porous medium;
- (b) monitoring the electroosmotic flow rate through the porous medium;
- (c) supplying an acid solution to at least one of the electrodes; and then
- (d) upon detecting a reduction of the rate of electroosmotic flow, supplying an acid solution and a zeta potential modifying compound to at least one of the electrodes.

36. The method of claim 35, further comprising the step of:
- (e) stopping the supply of the zeta potential modifying compound upon detecting an increase of the rate of electroosmotic flow.

* * * * *

UNITED STATES PATENT AND TRADEMARK OFFICE
CERTIFICATE OF CORRECTION

PATENT NO.  : 6,193,867 B1
DATED       : February 27, 2001
INVENTOR(S) : G. Duncan Hitchens It is certified that error appears in the above-identified patent and that said Letters Patent is hereby corrected as shown below:

Column 1,
Line 6, insert the following:
-- This invention was made with government support under contract number DACA39-93-C-0150 awarded by the United States Department of Defense (Army). The government has certain rights in this invention. --.

Signed and Sealed this

Eighteenth Day of October, 2005

JON W. DUDAS
*Director of the United States Patent and Trademark Office*